US005542695A

United States Patent [19]
Hanson

[11] Patent Number: 5,542,695
[45] Date of Patent: Aug. 6, 1996

[54] AIR BAG DEPLOYMENT SYSTEM

[75] Inventor: Ralph W. Hanson, Spooner, Wis.

[73] Assignee: R. Stresau Laboratory, Inc., Spooner, Wis.

[21] Appl. No.: 174,130

[22] Filed: Dec. 28, 1993

[51] Int. Cl.⁶ .................................................. B60R 21/24
[52] U.S. Cl. ........................ 280/729; 280/738; 280/739
[58] Field of Search ............................. 280/728 R, 729, 280/738, 743 R, 739, 743.1, 743.2

[56] References Cited

U.S. PATENT DOCUMENTS

| | | | |
|---|---|---|---|
| 3,638,964 | 2/1972 | Chute . | |
| 3,749,282 | 2/1972 | Day et al. . | |
| 3,784,225 | 1/1974 | Fleck et al. | 280/729 |
| 3,788,596 | 1/1974 | Maeda . | |
| 3,788,663 | 1/1974 | Weman | 280/729 |
| 3,843,150 | 10/1974 | Harada et al. | 280/729 |
| 3,861,710 | 1/1975 | Okubo . | |
| 3,862,767 | 1/1975 | Chute . | |
| 3,883,154 | 5/1975 | McCullough et al. | 280/738 |
| 3,884,497 | 5/1975 | Massengill et al. . | |
| 3,887,213 | 6/1975 | Goetz | 280/738 |
| 3,929,350 | 12/1975 | Pech | 280/738 |
| 3,982,774 | 9/1976 | Ivashuk et al. | 280/737 |
| 4,076,277 | 2/1978 | Kuwakado et al. | 280/738 |
| 4,203,616 | 5/1980 | Okada | 280/737 |
| 4,262,931 | 4/1981 | Strasser et al. | 280/729 |
| 4,275,901 | 6/1981 | Okda | 280/741 |
| 4,536,008 | 8/1985 | Brown, Jr. | 280/730 |
| 4,734,141 | 3/1988 | Cartwright et al. | 149/35 |
| 4,989,896 | 2/1991 | DiSalvo et al. | 280/732 |
| 4,991,870 | 2/1991 | Beusterien et al. | 280/732 |
| 4,995,638 | 2/1991 | Shinto et al. | 280/731 |
| 5,002,307 | 3/1991 | Heidorn | 280/731 |
| 5,018,762 | 5/1991 | Suzuki et al. | 280/731 |
| 5,342,087 | 8/1994 | Oda | 280/743 R |
| 5,382,048 | 1/1995 | Paxton et al. | 280/743 R |

FOREIGN PATENT DOCUMENTS 1470584  4/1989  U.S.S.R. ............... 280/728 R

Primary Examiner—Paul N. Dickson
Attorney, Agent, or Firm—Dorsey & Whitney LLP

[57] ABSTRACT

The present invention provides an inflatable air bag with a plurality of air valves and at least one internal, gas-operated extension member for deploying the bag, with three such members being preferred. The extension members are generally tubular, being inside the bag. Each is attached at its first, base end to a gas source, its second end being free. Prior to deployment of the air bag, the extension members are compactly within the bag. On demand, a gas source is activated to inflate the extension members, straightening each quickly into a substantially straight, elongated pressurized tube expanding the bag. Ambient air from the passenger compartment of the vehicle flows rapidly into the bag as it expands to create an impact-absorbing cushion.

6 Claims, 5 Drawing Sheets

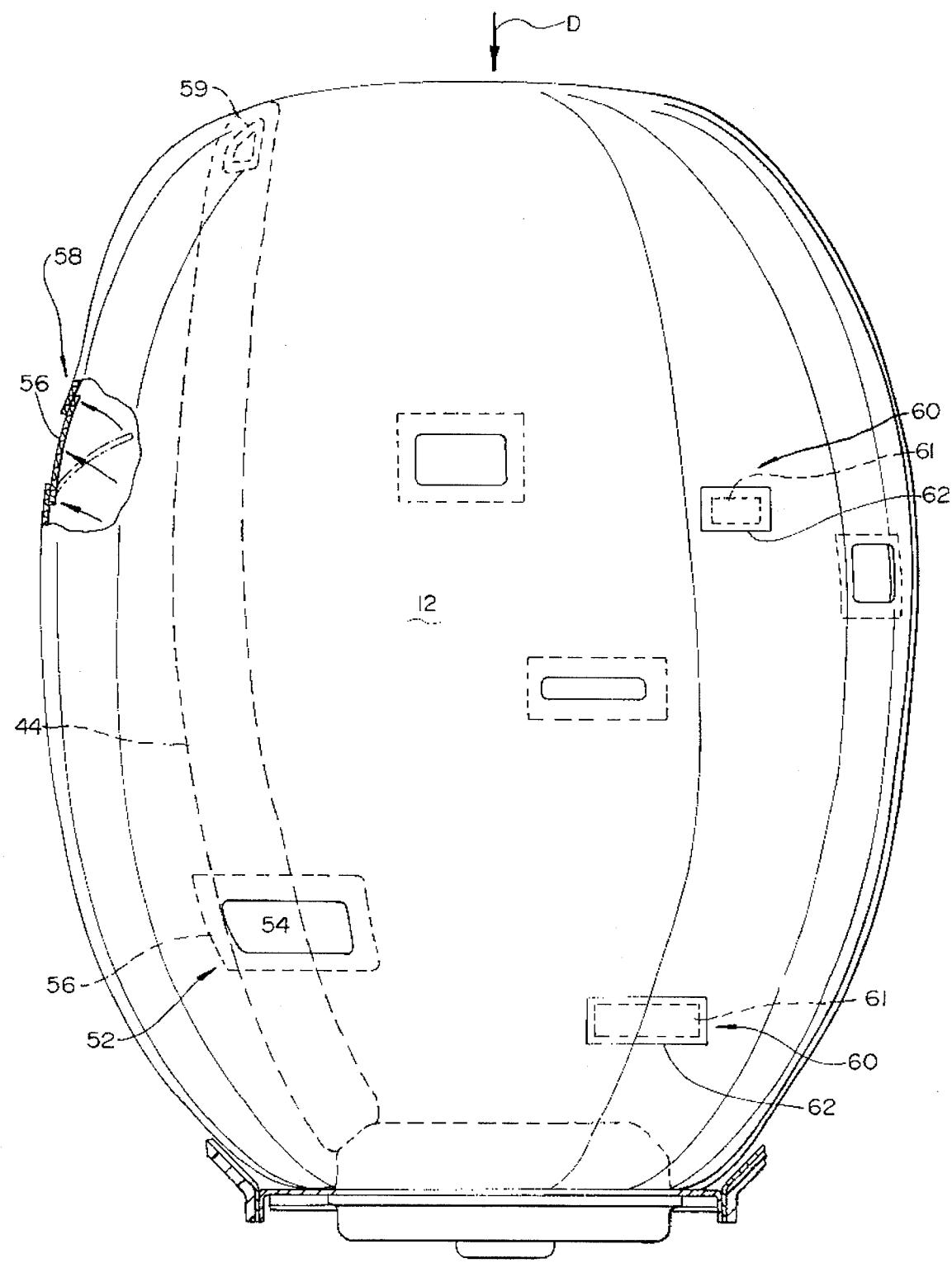

AIR BAG DEPLOYMENT SYSTEM

TECHNICAL FIELD

The present invention relates to safety systems for use in vehicles, particularly automobiles and the like. More specifically, it relates to an air bag safety system including an air bag fillable with ambient air, and an air bag deployment or extension apparatus, driven by a gas, which uses as little of the gas as possible to expand the air bag.

BACKGROUND OF THE INVENTION

Air bags are inflatable cushion or pillow-like restraint devices positioned in vehicles in front of riders to protect them from pitching forward into solid parts of the vehicle in the event of an accident. They have become well-known safety features in currently available automobiles and the like. Typically, air bag safety systems are incorporated into the steering wheel and dash or instrument panel of a vehicle and are designed to expand automatically and rapidly in the event of sudden deceleration or collision to prevent potentially injurious forward movement of the occupant. Such systems may be operated by release of a stored supply of compressed gas or activation of gas-producing propellant compositions such as azide/oxidizer compositions. The latter involve azide salts or like substances which produce nitrogen or another inert gas when reacted with an oxidizing agent.

To be useful, air bags require a minimum of expansion time, as little as twenty to sixty milliseconds, since they are inflated or expanded slightly before or just after a deceleration or impact. Expansion pressure produced by the inflation of air bags is very high, causing the air pressure in the vehicle passenger compartment to increase very rapidly, possibly causing injury. This problem is particularly severe when multiple air bags, including rear seat bags, are provided. U.S. Pat. No. 3,861,710 (to Okubo) attempts to solve the pressure problem by providing for the incremental or delayed full expansion of an air bag. Somewhat similarly, U.S. Pat. No. 3,862,767 (to Chute), 3,638,964 (also to Chute) and 3,884,497 (to Massengill et al.) are directed to controlling the flow of inflating gas for air bag systems. However, as stated above, and in the Okubo patent, an air bag must inflate within a certain amount of time to be effective. Delaying or lengthening the time required for full inflation to avoid pressure increases may prevent timely or sufficient inflation.

Another problem is that large quantifies of inflating gas may have a harmful, or at least unknown, effect on vehicle occupants. Efforts are made to use inert, nontoxic and noncorrosive gases, but it would be advantageous to reduce the required quantity of inflating gas to a minimal level.

U.S. Pat. No. 5,018,762 (to Suzuki et al.) discloses a fairly representative air-bag device which, in the event of a collision, is inflated by gas flow, but which also obstructs or controls the flow of gas in the air-bag to avoid the flow of gas to the upper portion of the bag. There is no suggestion of how to control or prevent sudden pressure increases in the passenger compartment of the vehicle, or of how to reduce the quantity of inflating gas used.

U.S. Pat. No. 4,536,008 (to Brown, Jr.) discloses an occupant restraining device including an air bag with internal telescoping tubes extending through the air bag and attached to a pelvic and torso engaging means. In operation, a firing assembly detonates a cartridge in a transverse mounting tube. Gases from the cartridge escape into the telescoping tubes, extending the tubes and passing through apertures in the tubes, expanding and inflating the air bag. The air bag may contain one or more flapper valves to enable the intake of air upon the rapid expansion of the bag by the telescoping tubes, to seal the bag upon inflation, and to release pressure from the bag upon depression of the flapper valve by the occupant or rescue personnel. The Brown, Jr. restraint device is mountable only at and deployable from the interior overhead of a vehicle, thereby limiting its application, and does not include an automatic pressure release mechanism.

A problem unaddressed by the Brown, Jr. patent is that the mere presence of an extended length of relatively rigid metal or plastic, i.e., the telescoping tubes, may pose dangers in certain accident situations. The device disclosed in U.S. Pat. No. 3,675,942 (to Huber) avoids this problem by providing an air bag incorporating passageways comprising a space between two skins forming the bag. The passageways are inflated to extend the bag, which has unidirectional valves to permit ambient air to be drawn into the bag as it is extended. There is no disclosure of free-standing inflatable, extending means for extending the bag in a desired shape or direction, nor is there any suggestion of how to release pressure from the passageways or the bag just before or upon impact to provide an enhanced cushioning effect.

SUMMARY OF THE INVENTION

The present invention provides an inflatable air bag having a plurality of ambient air check valves and at least one internal, gas-operated extension members for deploying the bag, with three such members being preferred. Each extension member is inside the bag, has two ends and is generally tubular, being attached at its first, base end to a gas source, with its second end being free. Prior to deployment of the air bag, the extension members are compact within the bag. On demand, a gas source is activated to inflate the extension members, quickly extending them into a substantially straight, elongated, finger-like pressurized tubes which deploys the bag and creates a vacuum or less than ambient pressure therein. Ambient air from the passenger compartment of the vehicle flows rapidly into the bag as it expansion, thereby creating an impact-absorbing cushion.

More specifically, the air bag deployment system in accordance with the present invention comprises an inflatable bag provided with a plurality of ambient air check valves and internal, gas-operated, extendable deployment means for deploying the bag. The deployment means has a much smaller volume than the air bag and further comprises three relatively long, divergent, non-coplanar, generally tubular bag extension members made from a flexible, fabric-like material. The extension members are entirely inside the bag and may be formed from the same material, but are not integrated with or permanently connected to the bag skin or wall. They are attached at a first, base end to a gas source or manifold, their second end being free. Prior to deployment, the extension members are compressed, curled or spirally wound compactly within the bag, the bag and contained extension members being within an air bag housing or cover, generally a portion of the steering wheel or dashboard of a vehicle.

On demand, i.e., in the event of an imminent or sensed sudden deceleration or impact, the gas source is activated to inflate the extension members. As they are inflated, the extension members uncurl, straighten or unwind into substantially straight, elongated, finger-like pressurized, generally cylindrical tubes, contacting the inside of the bag adjacent to the end of the straightening members and deploying the bag as they unwind and extend. The members are approximately 120 degrees apart around the gas source manifold, and extend at approximately 45 degrees relative to the manifold, thereby providing for the divergent, non-coplanar extension and adequate extension of the air bag. Ambient air from the passenger compartment of the vehicle flows rapidly into the bag through a plurality of one-way check valves in the skin of the bag as it is being extended by the extension members. The fully expanded bag, filled with ambient air, creates an impact-absorbing cushion. The bag and the extension members are provided with one-way, pressure-releasing valves which release air pressure upon the impact of a passenger striking the inflated bag, further enhancing the cushioning effect.

An object of the present invention is to provide a safety system for protecting occupants of a vehicle during a sudden deceleration, wherein the system includes a deployable air bag fillable substantially with ambient air, thereby avoiding a rapid increase in pressure in the vehicle passenger compartment upon deployment of the bag.

Another object of the present invention is to provide a deployable air bag safety device for automobiles and the like wherein the quantity of gas, other than ambient air, used to deploy the air bag is reduced to a minimum.

Still another object of the present invention is to provide an inflatable air bag restraint device for use in land vehicles, watercraft and the like, wherein the device includes at least one air bag and means for expanding the air bag comprising at least one, and preferably three, gas-powered, inflatable air motors contained wholly within the bag.

An advantage of the present invention is that using the inflatable means for expanding an air bag, wherein the means for expanding has a significantly smaller volume than the air bag and wherein only the means for expanding is inflated by pressurized gas from a stored quantity of such gas or from a pyrotechnical chemical reaction, reduces the quantity of chemical agents required to inflate the bag and, therefore, reduces occupants' exposure to such agents. The present invention uses less than ten percent of expansion gas typically used to inflate an air bag, thereby reducing contaminants entering the passenger compartment after bag deployment and reducing propellant residue in the gas manifold or gas generating unit, allowing for safer, easier disposal of expended units.

Another related advantage of the present invention is that it enables and facilitates the use of stored gas air bag inflation systems because the filling of the air bag by ambient air, i.e., the filling of only the means for expanding the bag with stored gas, reduces the volume of gas that has to be stored.

Other objects and advantages of the present invention will become more fully apparent and understood with reference to the following description and to the appended drawings and claims.

BRIEF DESCRIPTION OF THE DRAWINGS

FIG. 6 is an elevational view depicting the exterior of an air bag deployed by the apparatus of the present invention, and some of the ambient air flow valves thereof.

DETAILED DESCRIPTION OF THE PREFERRED EMBODIMENT

Figure 1:
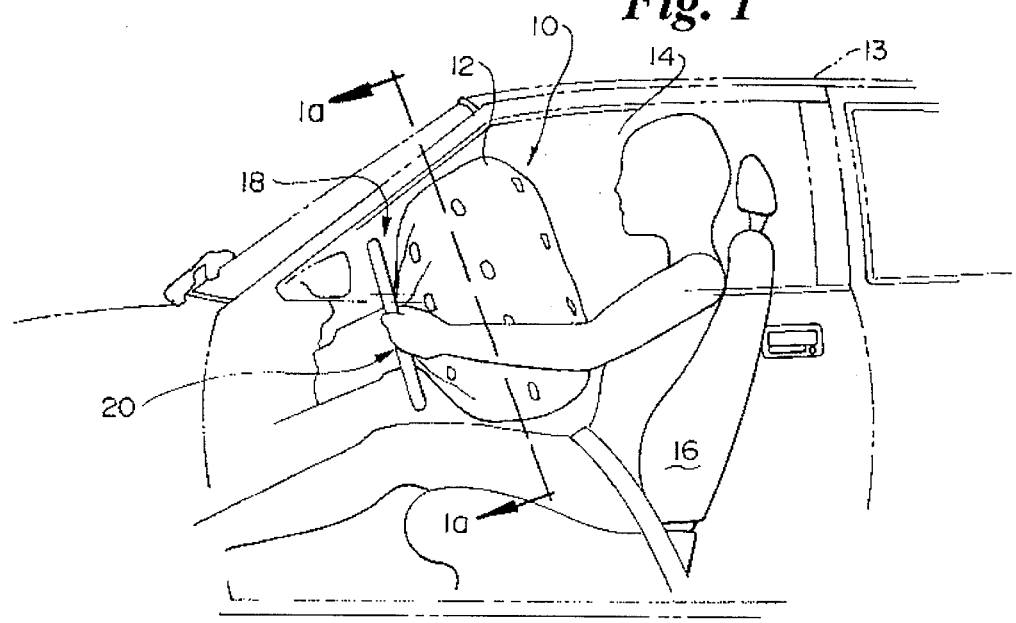
FIG. 1 is a simplified schematic representing an air bag restraint deployed in a vehicle also, depicting in phantom the three-dimensionally disposed, i.e, non-coplanar and diverging, air motor expanding means of the present invention.

Referring to the drawings an air bag deployment system in accordance with the present invention is depicted. FIG. 1 shows the customary deployment of an air bag system 10, including at least one air bag 12, in a vehicle such as an automobile 13 having an occupant or passenger compartment 14 and conventional passenger seat 16. FIG. 1 shows the air bag 12 deployed from a conventional steering wheel assembly 18, specifically, the central hub portion 20 thereof.

Figure 2:
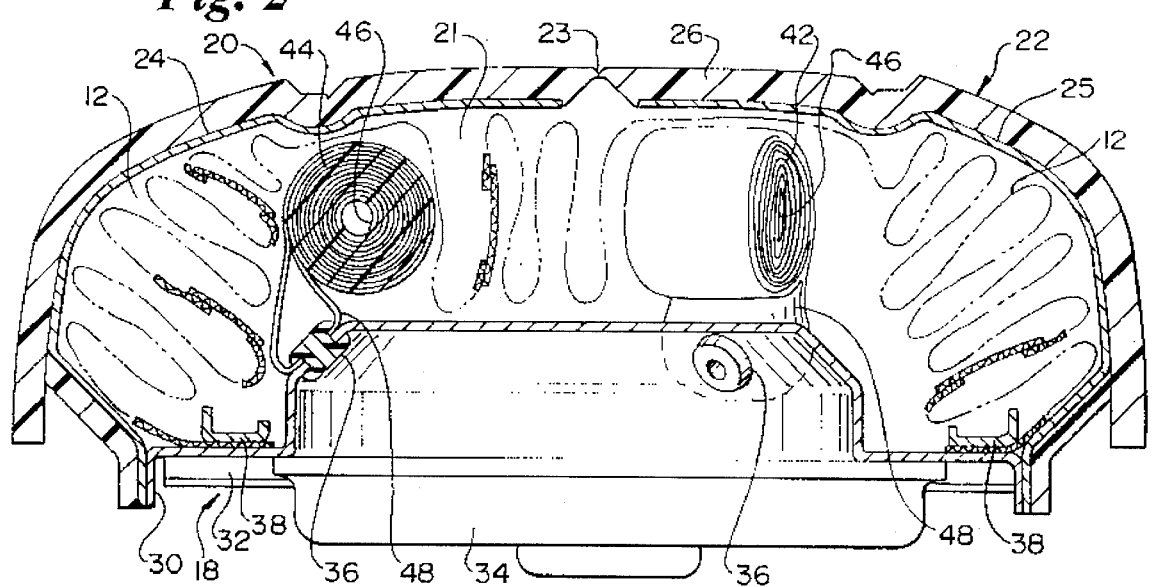
FIG. 2 is a cross-sectional view of an undeployed air bag, within a typical associated air bag cover, depicting the expandable deployment apparatus of the present invention in its predeployment condition.

Referring to FIG. 2, the air bag 12 is mounted in the hub 20 of the steering assembly 18 in a cavity 21 covered by an air bag module cover assembly 22. The cover 22 is adapted to open at predetermined areas, for example along seam 23, so that the air bag 12 can be deployed freely. Alternatively, the entire cover 22 may be designed to break free and move outwardly away from the cavity 21. The cover 22 includes a pair of internal support members 24, 25, formed of a stiff thermo-plastic or suitable metallic material, and a softer, outer cover member 26 formed of a suitable material such as urethane.

The support members 24, 25 are connected to a flange 30, in turn connected to a mounting bracket 32. A gas generator or manifold 34 is also mounted to the bracket 30, and includes multiple gas ports 36 at various locations. The ports 36 are uniformly arranged, approximately 120 degrees apart, with respect to the manifold 34. Although a uniform arrangement is preferred, it is not absolutely required and the ports could be arranged eccentrically relative to the manifold and to each other. The air bag 12 is secured and sealed to the flange 30 by a suitable, annular retaining bracket 38. Thus mounted, the air bag 12 generally surrounds or envelopes the portion of the manifold 34 within the cavity 21 in a compact pleated or folded state, until deployment upon demand. Although only a steering wheel assembly mounting is depicted, dashboard or rear seat mounting of the present invention would be substantially similar.

Figure 1A:
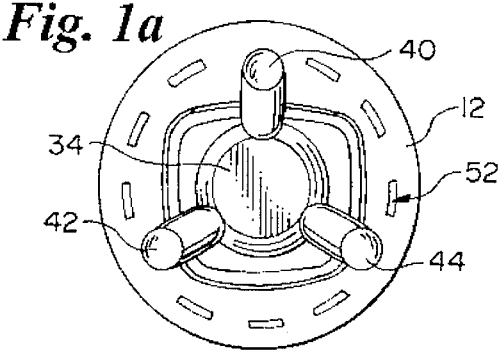
FIG. 1A is a sectional view taken along line 1A—1A of FIG. 1.
Figure 5:
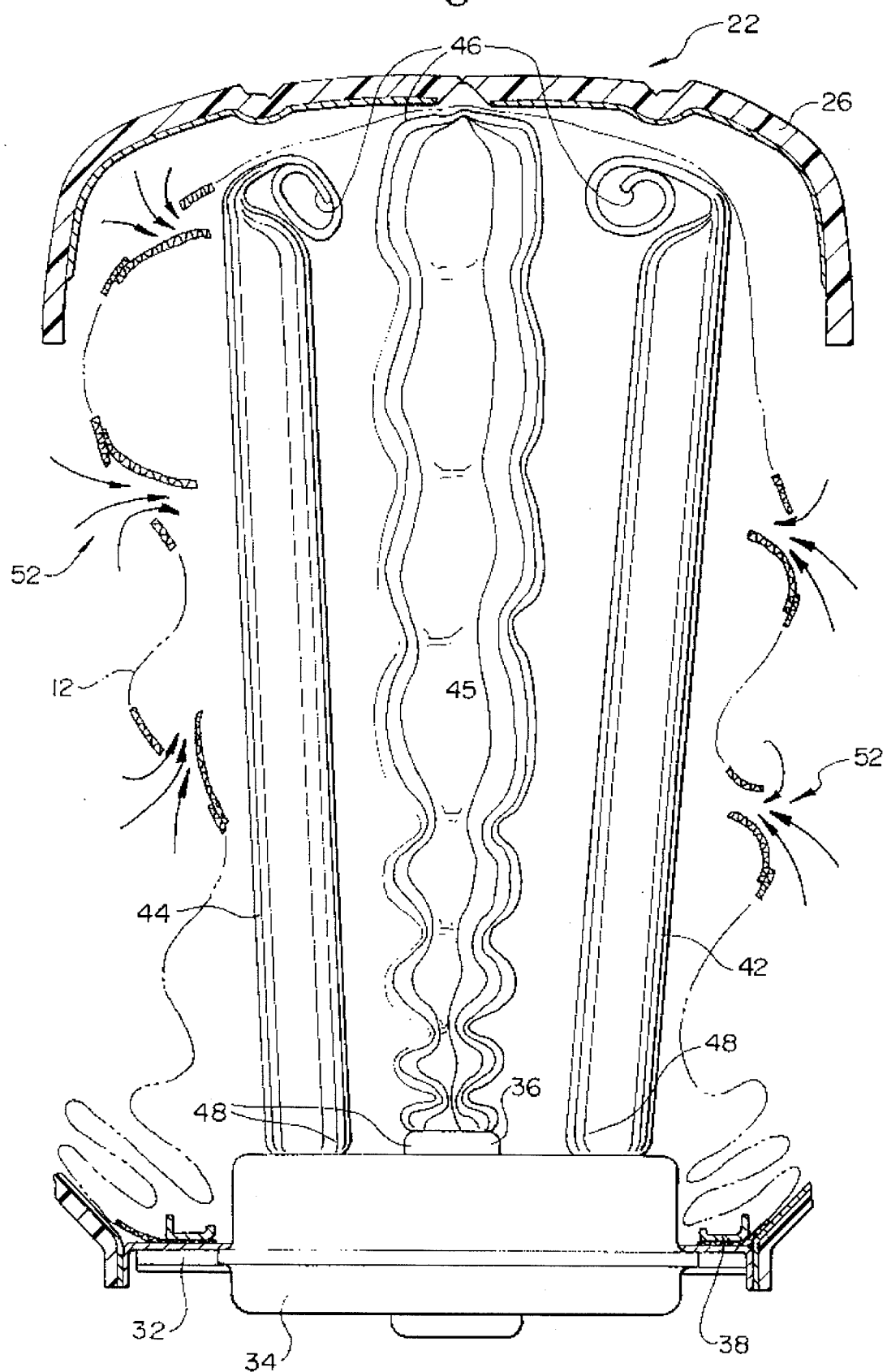
FIG. 5 is a cross-sectional view of another alternative embodiment of the present invention.

With continued reference to FIG. 2, the air bag deployment system of the present invention, shown in its predeployment state within the air bag 12, comprises three extendable, roll-coiled air-driven extender motors 40, 42 and 44. (Only two are visible in FIG. 2, a sectional view.) The three extender motors 40, 42, 44, also shown fully extended in FIG. 1A, are disposed entirely within the air bag 12, but are separate and discrete therefrom, i.e., they are unattached to the air bag 12. Each motor 40, 42, 44 includes a free end 46 and a fixed end 48. The fixed end 48 of each motor 40, 42, 44 is fixed to the manifold 34 about a respective port 36 such that the port orifice opens directly into the interior of the motor. Inflating gas generated in or passing through the manifold 34 flows directly into the motors. Although three air bag extending and expansion motors 40, 42, 44 are depicted, and at least three divergent, non-coplanar motors are preferred, the number of such expanding means, their shape and locations, and the direction and length of extension may be varied, being directly related to desired air bag parameters such as vehicle size, pressure requirements and passenger compartment layout. For example, referring to FIG. 3, a single central "accordion folded" motor 45, with a bulbous free end 46' may be used. Alternatively, referring to FIG. 5, an "accordion folded" motor 45 may be used with at least one ribbon-coiled motor 40, 42, 44 (two such motors 42, 44 being shown in FIG. 5). The ports 36 are located, positioned and angled to help achieve this, as reflected in FIG. 1, wherein the ports 36 are positioned at an angled side wall of the manifold 34.

Figure 3:
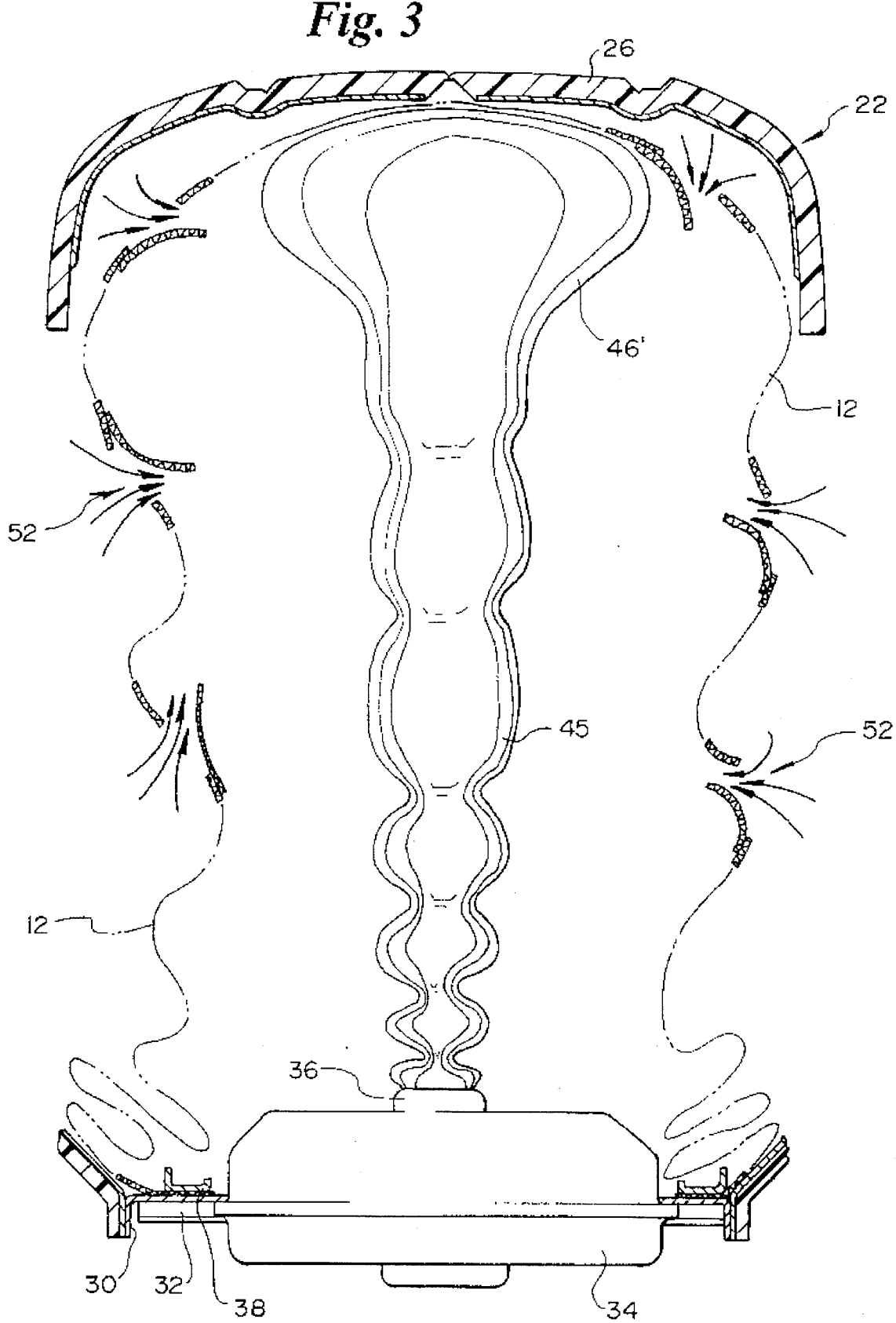
FIG. 3 is a cross-sectional view of an alternative embodiment of the present invention.

With continued reference to FIG. 3, prior to deployment, it should be appreciated that the central motor 40 is compactly compressed into a short, generally cylindrical shape, having pleated or accordion folded walls. In contrast, referring to FIG. 2, each of the roll-coiled motors 40, 42, 44, in their predeployment or pre-expanded state, are flattened, spirally-wound, ribbon-like coils. Any or all of the motors 40, 42, 44, 45 may be formed from the same material that the air bag 10 is formed from.

Figure 4:
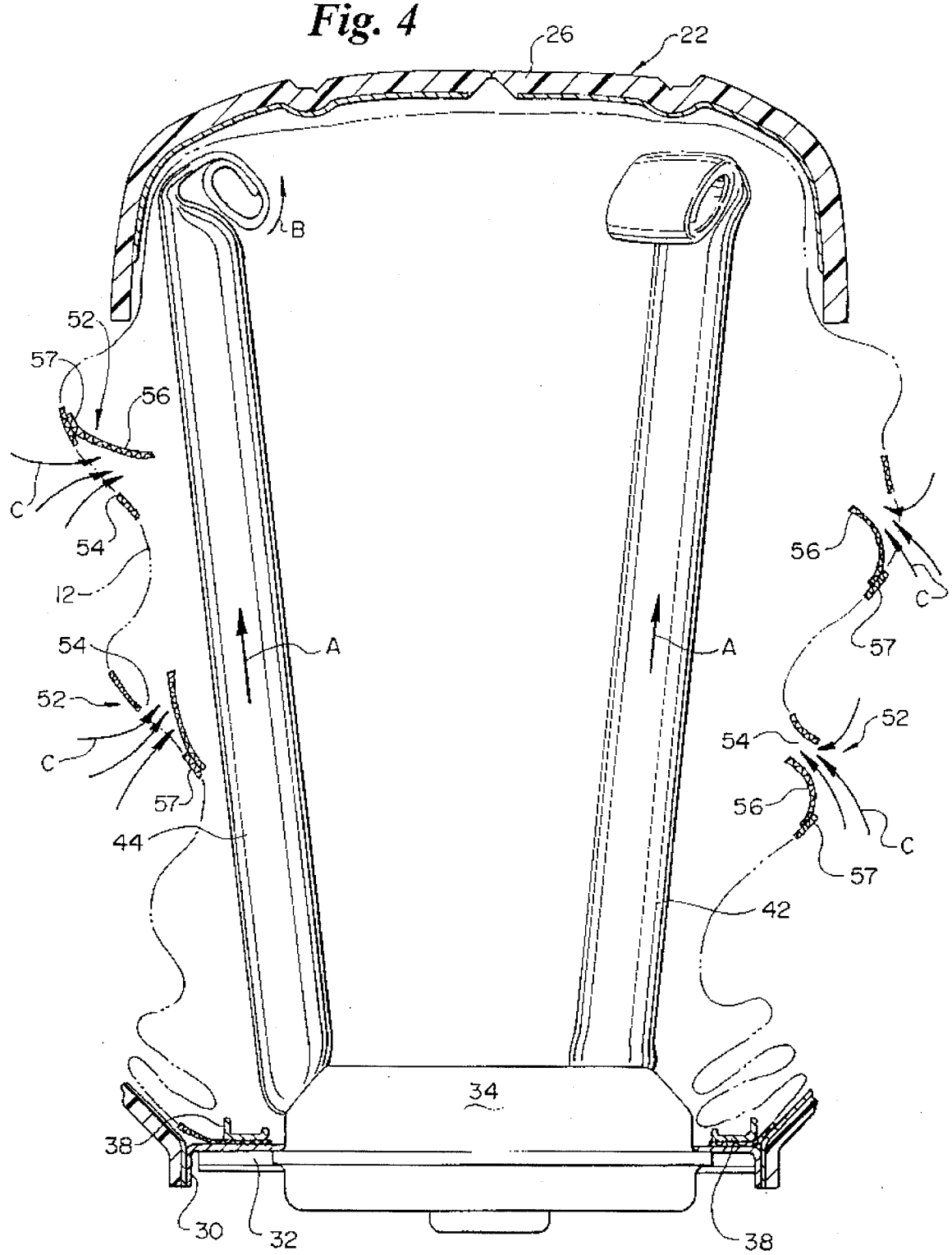
FIG. 4 is a cross-sectional view of a deployed air bag, depicting the deployment apparatus of the present invention in its post-deployment condition.

Referring to FIG. 4, an air bag 12 is depicted in a fully or nearly fully deployed condition. Upon impact or sensed imminent rapid deceleration or impact, an inflating gas of suitable composition is released through or generated in the manifold 34. The gas flows rapidly through the gas port orifices into the motors 40, 42, 44 (as in FIG. 2, only motors 42, 44 are visible) causing the roll-coiled motors 40, 44, 42 to expand outwardly along the arrows A. Arrows B depict the uncoiling motion of the rolled motors 40, 42, 44.

The extension of the extending motor members 40, 42, 44 drives the outer cover member 26 outwardly, carrying the bag 12 with it. The extension or expansion of the bag 12 creates a low pressure region or vacuum within the bag 12, drawing ambient air into the bag along the arrows C, from the passenger compartment. The air is drawn in through a plurality of one-way check or flapper valves 52.

The valves 52 may take the form of slits or openings 54 of various suitable sizes and shapes, depending on the volume of the bag 12. A flexible membrane 56 of a larger size than the associated opening 54 is located inside the bag 10 and is fastened along one edge of the adjacent opening 54 to provide a hinge structure 57, allowing the membranes 54 to open and close as the pressure in the bag 12 is more or less than ambient pressure. The contacting surfaces of the valves 52 may be treated or coated to facilitate sealing during the compression phase, i.e., when the membrane 54 is lying along the inside surface of the valve 52 (and bag 12). The latter state is depicted generally at 58 in FIG. 6.

With continued reference to FIG. 4 and with reference to FIG. 6, at full extension or pressurization, the motors 40, 42, 44 automatically release the relatively small amount of inflating gas therein, which mixes with the larger quantity of ambient air in the bag 12. This is done to reduce the rigidity of the motors, and may be accomplished by providing each motor 40, 42, 44 with a pressure-releasing or vent valve, depicted in phantom with respect to motor 44 at 59 in FIG. 6. Alternatively, the free ends of the motors may be open, or the material from which the motors are made may be permeable.

The impact of a vehicle occupant striking the air bag 12 is depicted at arrow D in FIG. 6. At the instant of impact, some air, or air and inflating gas mixture, is released from the bag 12, allowing the bag 12 to soften or collapse partially so that the person being restrained is decelerated gently with a minimum amount of rebound. This is accomplished by providing a number of venting valves 60. The venting valves 60 include an opening 61 and a membrane 62, and are substantially similar to the valves 52, but operate in the opposite direction. Fewer venting valves 60 are required (relative to the filling valves 52) because deflation of the bag 12 does not have to be as rapid as inflation.

Although the air bag deployment system of the present invention is depicted using three air motors 40, 42, 44 in a preferred embodiment, it should be appreciated that as long as sufficient three-dimensional expansion of the bag occurs, any number of such motors may be used, and the selected motor or motors may be the accordion pleated type 45 or the roll-coiled type 40, 42, 44. Any type motors may be used alone or together, the latter mix of motor types being depicted in FIG. 5, wherein an "accordion type" motor 45 is shown deployed with at least two ribbon type motors 42, 44. The motors may be inclined, angled and shaped to provide air bag deployment in any geometric shape, for example, one or more motors may be positioned to extend the bag or a portion thereof generally upwardly to offer additional protection for the head and face of a vehicle occupant. The selected motor(s) may be mounted or attached at any surface or combination of surfaces associated with the gas manifold 34 located inside the air bag. Additionally, the motors may be provided with more than a single one-way valve 57 to release the small amount of gas contained therein. The material for fabricating the bag and motors may be sufficiently permeable so that the ambient air and expansion gas mix filling the bag 12 can permeate at a rate sufficient to provide a suitable collapse or deflation rate, thereby lessening the number of vent valves required.

Although a description of the preferred embodiment has been presented, it is contemplated that various changes, in addition to those mentioned above, could be made without departing from the spirit of the present invention. It is therefore desired that the described embodiment be considered as illustrative, not restrictive, and that reference be made to the appended claims to determine the scope of the invention.

What is claimed is:

1. A safety system for use in a vehicle comprising:
    an inflatable bag having an interior and valve means for the passage of ambient air into and out of the bag; and
    expanding means for expanding the bag, said expanding means in the interior of the bag and operably coupled to a gas source, said expanding means comprising at least two separate non-coplanar generally tubular inflatable members having a first end connected directly to the gas source and a free end, said members having a pre-extended configuration and an extended configuration, said pre-extended configuration being compact, having a smaller volume than the extended configuration, said members in said extended configuration when said inflatable bag is expanded and being elongated and generally cylindrical, the expanded bag being spaced from the first end of the members and contacting said members adjacent to the free ends.

2. The safety system according to claim 1, said expanding means including a third member for expanding the bag in three-dimensions, said third member being non-coplanar and substantially identical with respect to said at least two members.

3. An air bag for use in a vehicle passenger compartment, said air bag comprising:

an inflatable air bag with an interior formed by a single thickness bag wall, said air bag having an uninflated state and an inflated state;

a plurality of air valves in said bag wall; and three separate non-coplanar, divergent gas-operated extension members for expanding the bag, each inside the interior and each having a base end operably coupled to a gas source associated with the vehicle, a free end, a compact pre-extended configuration and a substantially straight, elongated, tubular extended configuration, wherein, upon demand, the gas source is activated to fill the extension members with gas, straightening each quickly whereby the members contact the bag wall along a portion of the length of the members between the base end and the free end while straightening carrying the bag wall outwardly as the members move from the pre-extended to the extended configuration, each free end contacting the bag wall when said members are straightened, thereby expanding the bag, and wherein, as the bag expands, ambient air from the passenger compartment flows rapidly into the bag interior through the plurality of air valves to form an impact-absorbing cushion.

4. The air bag according to claim 3, wherein, in said pre-extended configuration at least two of said members are generally flattened and spirally wound, the other member being compressed and having an accordion-folded wall, and in said extended configuration said members are unwound and uncompressed, respectively, and generally straight, elongated and cylindrical.

5. The air bag according to claim 3, wherein the plurality of air valves includes a number of one-way valves for permitting ambient air to flow into the bag as the bag is being expanded and a fewer number of one-way valves for permitting air to flow out of the expanded bag.

6. The air bag according to claim 5, wherein each member includes a pressure-releasing one-way valve adjacent to each free end.

* * * * *